(Model.)

J. B. MARQUIS.
DAIRY APPARATUS.

No. 265,844. Patented Oct. 10, 1882.

Witnesses.
Jas. E. Hutchinson.
Henry C. Hazard.

Inventor
Jas. B. Marquis, by
Geo. S. Prindle, his Atty.

UNITED STATES PATENT OFFICE.

JAMES B. MARQUIS, OF NORWICH, NEW YORK.

DAIRY APPARATUS.

SPECIFICATION forming part of Letters Patent No. 265,844, dated October 10, 1882.

Application filed March 4, 1882. (Model.)

*To all whom it may concern:*

Be it known that I, JAMES B. MARQUIS, of Norwich, in the county of Chenango, and in the State of New York, have invented certain new and useful Improvements in Dairy Apparatus; and I do hereby declare that the following is a full, clear, and exact description thereof, reference being had to the accompanying drawings, making a part of this specification, in which—

Figure 1:
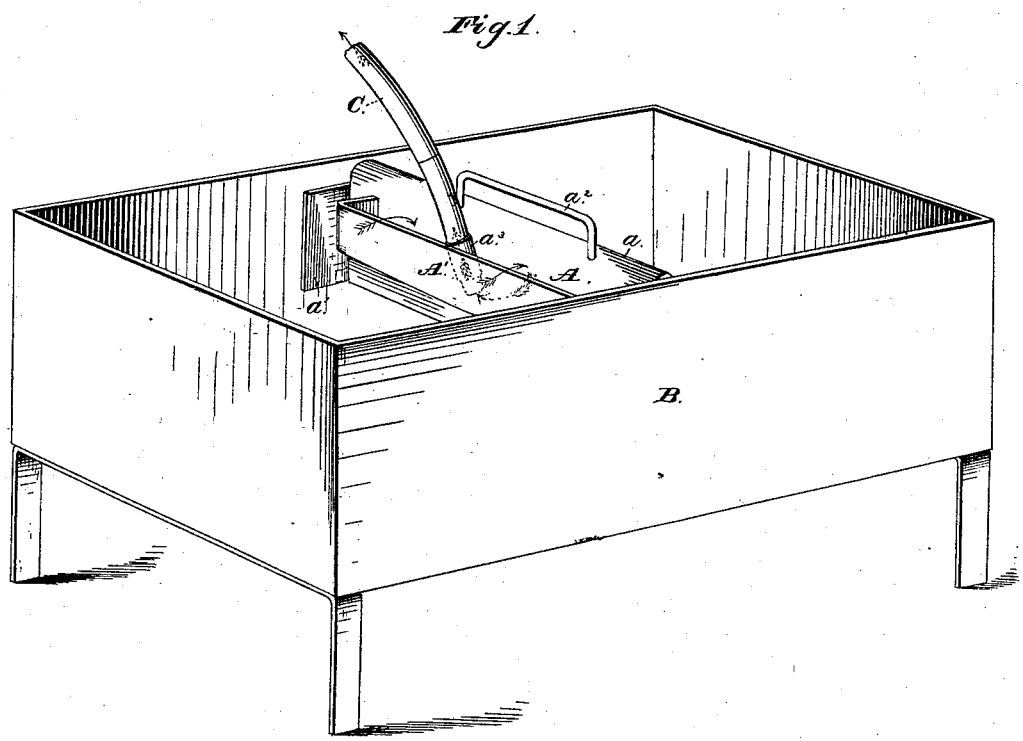
Figure 2:
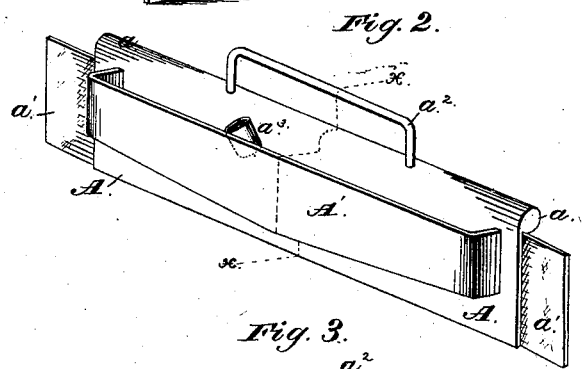
Figure 3:
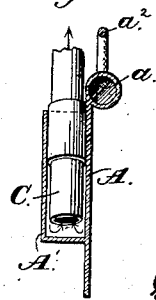

Figure 1 is a perspective view of my apparatus as used within a milk-vat. Fig. 2 is a like view of the same separated from said vat, and Fig. 3 is a cross-section upon line $x\ x$ of Fig. 2.

Letters of like name and kind refer to like parts in each of the figures.

The design of my invention is to enable cream to be easily and quickly removed from the surface of milk within a vat and prepared for immediate churning; and to this end it consists in the combination of a skimming-vessel adapted to be partially submerged within milk and drawn horizontally through the same, with a suction-pipe and means whereby cream entering said vessel may be caused by atmospheric pressure to pass through said pipe into a suitable receptacle, substantially as and for the purpose hereinafter specified.

In the annexed drawings, A represents a blade having a width considerably greater than the usual thickness of a stratum of cream as it rises from and rests upon the surface of a vat, B, of milk, and a length nearly equal to the inside width of such vat. Secured to or forming part of the upper edge of the blade A is a hollow cylinder, $a$, which operates as a float, and has such dimensions as to enable it to sustain the weight of said blade, when placed within milk, and hold the same in a vertical position. At each end of the blade A is provided a rubber plate, $a'$, which extends outward in a line with said blade, and has sufficient rigidity to cause it to press firmly against the sides of a vat, when the device is placed across and drawn lengthwise of the latter, and to remove from said sides such cream as may adhere to the same. A handle, $a^2$, is preferably affixed to the upper side of the float $a$, but, if desired, may be omitted.

The device thus constructed may be used by being placed within the milk of a vat, at a right angle to the longest axis of said vat, and permitted to float upon the surface of said milk, after which, by being moved lengthwise of said vat, it will carry in the same direction whatever cream there may be and deposit it within a suitable nearly-submerged vessel. The rubber ends $a'$ operate to remove such cream as would otherwise adhere to the sides of the vat and render the skimming operation complete. The operation of removing cream is, however, simplified and rendered more easy by the following-described additions to the said skimmer:

Upon one face of the blade A is secured a vessel, A′, which has its upper horizontal edge upon substantially the line of division between the milk and cream when the skimmer is floating, as described, so that as the latter is moved forward the cream will pass into said vessel. A thimble, $a^3$, arranged within the vessel A′, receives a pipe, C, which has its lower end near the bottom of the same and its upper end connected with a suction-pump, whereby cream passing into said vessel may be drawn out of the same and deposited within a suitable receptacle.

Having thus fully set forth the nature and merits of my invention, what I claim as new is—

1. The combination of a skimming-vessel adapted to be partially submerged within milk and drawn horizontally through the same, with a suction-pipe and means whereby cream entering said vessel may be caused by atmospheric pressure to pass through said pipe into a suitable receptacle, substantially as and for the purpose specified.

2. The hereinbefore-described skimmer, consisting of the blade A, provided with rubber ends $a'$, and having attached to its upper edge a float, $a$, substantially as and for the purpose shown and described.

In testimony that I claim the foregoing I have hereunto set my hand this 6th day of January, 1882.

JAMES B. MARQUIS.

Witnesses:
W. F. JENKS,
F. W. ROGERS.